United States Patent [19]

Buckmann

[11] Patent Number: 5,449,235
[45] Date of Patent: Sep. 12, 1995

[54] SELF-ALIGNING ROTOR-HYDROSTATIC BEARING SYSTEM

[75] Inventor: Paul S. Buckmann, Roseville, Calif.

[73] Assignee: Aerojet General Corporation, Sacramento, Calif.

[21] Appl. No.: 164,650

[22] Filed: Dec. 8, 1993

Related U.S. Application Data

[63] Continuation of Ser. No. 822,510, Jan. 17, 1992, abandoned.

[51] Int. Cl.⁶ .............................................. F16C 32/06
[52] U.S. Cl. .................................................... 384/108
[58] Field of Search ............... 384/109, 108, 145, 146, 384/206

[56] References Cited

U.S. PATENT DOCUMENTS

| 953,231 | 3/1910 | Rice . | |
|---|---|---|---|
| 2,998,999 | 9/1961 | Morser . | |
| 3,302,048 | 1/1967 | Gray . | |
| 3,537,763 | 11/1970 | Unterberger | 384/109 |
| 3,545,828 | 12/1970 | Korrenn | 384/108 |
| 3,552,810 | 1/1971 | Korrenn | 384/108 |
| 3,622,213 | 11/1971 | Onsrud . | |

OTHER PUBLICATIONS

Fuller, D., "Fluid-Film Bearings," *Marks Standard Handbook for Mechanical Engineers*, 9th Ed., pp. 114-131. (1987).
Cherumbin, J., "New Concepts in Bearing Designs and Applications", *Industrial Tectonics*, pp. 63-65 (No Date).
Morton, H., *Anti-Friction Bearings*, 2nd Ed. pp. 240-242 (No Date).
Radzimovsky, E., *Lubrication of Bearings-Theoretical Principles and Design*, pp. 247-279 (No Date).

*Primary Examiner*—Lenard A. Footland
*Attorney, Agent, or Firm*—Townsend and Townsend Khourie and Crew

[57] ABSTRACT

A self-aligning rotor-hydrostatic bearing system and method of bearing operation are provided. A rotor includes a surface defining a portion of a sphere. A bearing having a concave spherical surface adjacent the rotor spherical surface is movable with respect to the rotor. Movement, in one embodiment, is controlled by a piston which also provides pressurized lubrication fluid to a recess formed in the bearing spherical surface. Centrifugal deformation of the rotor is accommodated by axial movement of the bearing and/or contouring of a portion of the rotor. A pivoting bearing pad can be provided to accommodate centrifugal, thermal or other deformation. The rotor surface and the pivoting pad surface can be spherical or conical. A slotted bearing ring permits pivoting while maintaining a continuous seal surface.

4 Claims, 8 Drawing Sheets

SELF-ALIGNING ROTOR-HYDROSTATIC BEARING SYSTEM

This is a continuation of application Ser. No. 07/822,510, filed Jan. 17, 1992, now abandoned.

FIELD OF THE INVENTION

The present invention relates to a hydrostatic bearing system such as is useful in high performance turbo machinery and in particular to a self-aligning rotor-bearing system with the bearing surfaces having the shape of a portion of a sphere and being movable with respect to the rotor.

BACKGROUND OF THE INVENTION

Bearings used for rotating devices have a long history of development. However, special applications for bearings present problems not satisfactorily solved by previous devices. Such special applications include applications which require high rotational speed, high pressure operation, high load capacity, close tolerance and/or operation on a low viscosity fluid. Examples of such special applications include high-speed turbo pumps such as rocket propellent pumps or other fluid pumps which may be used, for example, in the National Aerospace Plane (NASP), the Orbital Transfer Vehicle (OTV), and the Space Shuttle main engine (SSME).

Bearings which have been used in high-speed applications have included ball bearings, plane hydrodynamic bearings, hydrodynamic foil bearings and separate thrust and journal hydrostatic bearings. As an example, in one design for a high pressure fuel pump of the Space Shuttle main engine, ball bearings were placed at the outboard ends of the shaft to accommodate bearing speed limitation (DN) limits. This design led to a supercritical rotor design which, in turn, resulted in an unstable rotor which was subject to destructive and unpredictable subsynchronous whirl.

The foil bearing has inherently low stiffness (e.g., $1 \times 10^5$ lb/in, about $1.8 \times 10^5$ N/cm, for applications such as the special applications described above) and large deflection (0.010 in, about 0.25 mm) due to the compliant foils. The foil bearing also has low load capacity (i.e., unit loading less than 200 psi, about 1350 kPa) due to hydrodynamic action in low viscosity fluid. These characteristics are similar to those which led to subsynchronous whirl in the Space Shuttle main engine (SSME) fuel pump, described above.

Separate thrust and journal hydrostatic bearings have improved load capacity and stiffness and lower speed limitations compared to ball bearings and hydrodynamic foil bearings. However, for high-speeds, providing high stiffness also requires a very close radial clearance. This close radial clearance cannot practically and economically be obtained by contemporary machining. Furthermore, separate hydrostatic thrust and journal bearings in a high-speed application provide a device which is prone to variation of clearance with speed. This variation has been found to lead to unacceptable performance particularly in the special applications described above.

Certain previous devices have provided bearings which have a surface defining a portion of a sphere. For example, U.S. Pat. No. 2,998,991, issued Sep. 5, 1961 to Morser, et al., provides bearings which have clearances that range between 0.001 inches and 0.005 inches (about 0.0025 mm to about 0.127 mm). Typically, such previous devices have not been designed to provide the performance necessary for the special applications described above. Such previous devices are not designed to provide the extremely high rotation rates typically used in connection with low viscosity fluids. For example, at rotation rates greater than about 100,000 rpm and shaft surface radii of about 1.3 inches (about 33 mm) and clearances of about 0.001 in (about 0.025 mm), centrifugal forces tend to significantly distort the shape of portions of the shaft. The problems presented by such distortion are particularly acute in devices with extremely small clearances between the shaft and its bearing (e.g., about 0.0003 inches, about 0.0075 mm). Previous spherical bearings were not configured to accommodate such centrifugal growth.

SUMMARY OF THE INVENTION

According to the present invention, a self-aligning rotor-hydrostatic bearing system includes a spherical bearing which is movable with respect to the rotor surface. In one embodiment, the bearing is axially movable in response to pressure which is provided to a piston region. Axial movement of the bearing affects the clearance between the bearing and the rotor surface. Preferably, the same fluid which is used for providing a hydrostatic pressure to the hydrostatic bearing is also used for pressurizing the piston. This configuration provides for low recirculation flow in a turbo pump which is especially beneficial in low specific speed pumps. The configuration also provides both self-alignment (i.e., automatic alignment along the x and y axes normal to the shaft center line) and self-adjustment to accommodate manufacturing tolerances and thermal, hydraulic and mechanical deflections, while maintaining small operating clearances.

According to one embodiment of the invention, the spherical shaped bearing is provided so as to accommodate centrifugal shaft growth at high speed while maintaining constant operating clearance. The axially adjustable bearing is useful in providing the constant operating clearance, as described above. In one embodiment, distortion from the centrifugal force is accommodated by contouring to provide an inner radius in the rotor. In this manner, the chord angle of the arc of the sphere segment of the rotor is maintained substantially constant in response to centrifugal forces.

In one embodiment, the chord angle of the spherical segment varies in response to centrifugal force and this variation is accommodated by providing a bearing surface which adjusts to the rotating surface geometry change. In this embodiment, the bearing includes a pivotally mounted bearing pad. Hydrostatic variations within the bearing produce forces sufficient to pivot the pad. Preferably, the bearing pad is slotted to provide low torsional stiffness. This accommodates operation at low pivot forces while still maintaining continuous material to function as a seal.

DESCRIPTION OF THE PREFERRED EMBODIMENT

Figure 1:
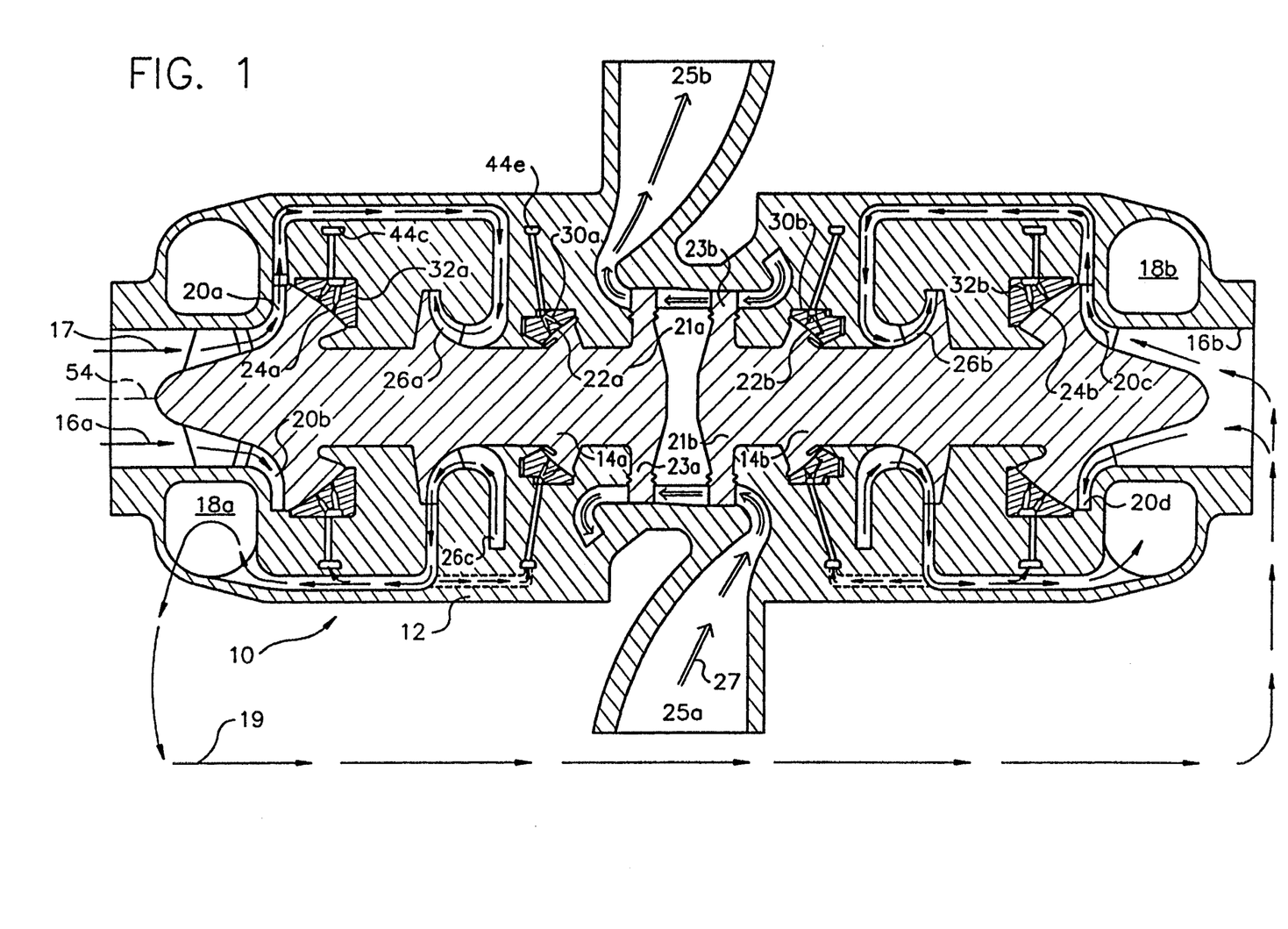
FIG. 1 is a simplified, cross-sectional view of a rotor housing and hydrostatic bearing apparatus according to one embodiment of the present invention.

As show in FIG. 1, a turbo pump 10 includes a housing 12 enclosing first and second rotatable spool-type rotors 14a, 14b. The housing 12 defines first and second inlet ports 16a, 16b and first and second outlet ports 18a, 18b. The rotors 14a, 14b include impeller vanes 20a–20d. Each spool 14a, 14b also includes a pump-end spherical surface 24a, 24b and a turbine-end spherical surface 22a, 22b.

Second impeller vanes 26a, 26b provide for conversion of fluid velocity into an increase in fluid pressure.

Arrows in FIG. 1 depict the flow of fluid through the turbopump 10. Because FIG. 1 is a cross-section, connections out of the plane of the cross-section cannot be seen in the view of FIG. 1. For example, flow that arrives at the second impeller 26a is in fluid communication with the region 26c. Many of the regions shown on the cross-section of FIG. 1 are substantially radially symmetrical about the pump longitudinal axis 54. The arrows in FIG. 1 also show flow of some amount of the fluid to reservoirs 44c, 44e and the like for providing fluid to the hydrostatic bearings. As discussed more thoroughly below, fluid provided to the bearings flows through the clearance between the bearing and the rotor to rejoin the fluid flow 17 and for this reason this portion of the flow is referred to as recirculation flow.

The embodiment depicted in FIG. 1 is a two-spool device. Fluid which enters the first inlet 16a exits from the first outlet 18a. Preferably, this fluid is then conveyed 19, such as by a conduit, not shown, to the second inlet 16b. After travel through the pump 10, this fluid exits through outlet port 18b.

In response to the flow of the fluid shown by the single-line arrows, the turbine disks 21a, 21b will rotate at a high speed such that the turbine blades 23a, 23b are effective to cause flow from the turbine inlet port 25a, and out of the turbine outlet port 25b, as shown by the double-lined arrows 27.

As described more fully below, a pump-end bearing 32a is positioned near the pump-end spherical surface 24a and a turbine-end bearing 30a is positioned near the turbine-end spherical surface 34a. The rotating member is preferably formed of a hard-coated material such as tiodize over titanium. The bearing surface is preferably tiodize over titanium.

Figure 2:
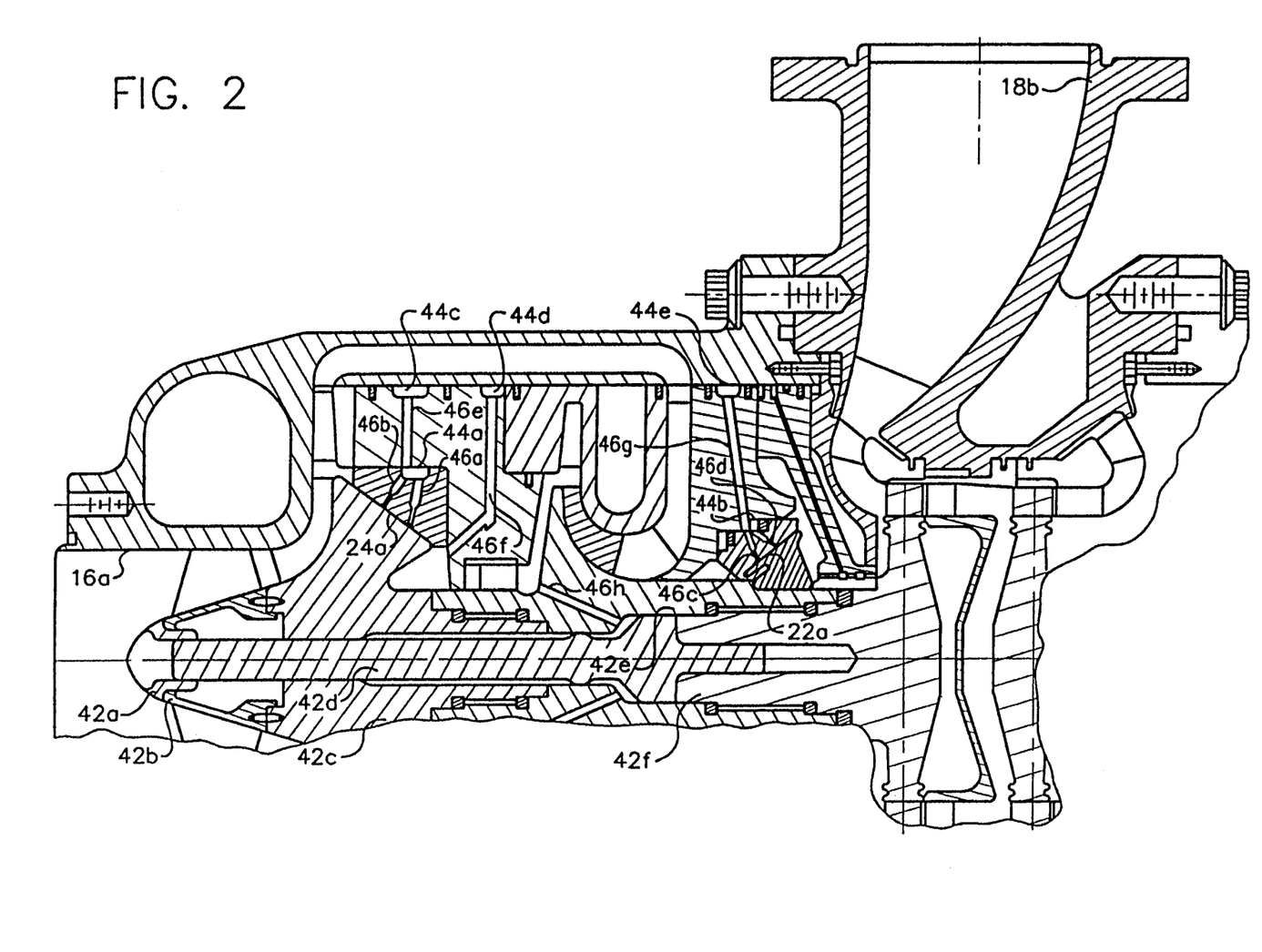
FIG. 2 is a view similar to that of FIG. 1 but showing additional details of the apparatus.

FIG. 2 depicts a turbo pump similar to that of FIG. 1 but in greater detail. Although it is possible to provide rotors 14a, 14b which are integrally formed, in the embodiment depicted in FIG. 2, the rotor is composed of several components 42a–42f. A plurality of reservoirs 44a–44e are coupled to orifices 46a–46h. The reservoirs 44a, 44b and orifices 46a46d, associated with the bearings 32a, 30a will be discussed in greater detail below.

Figure 3:
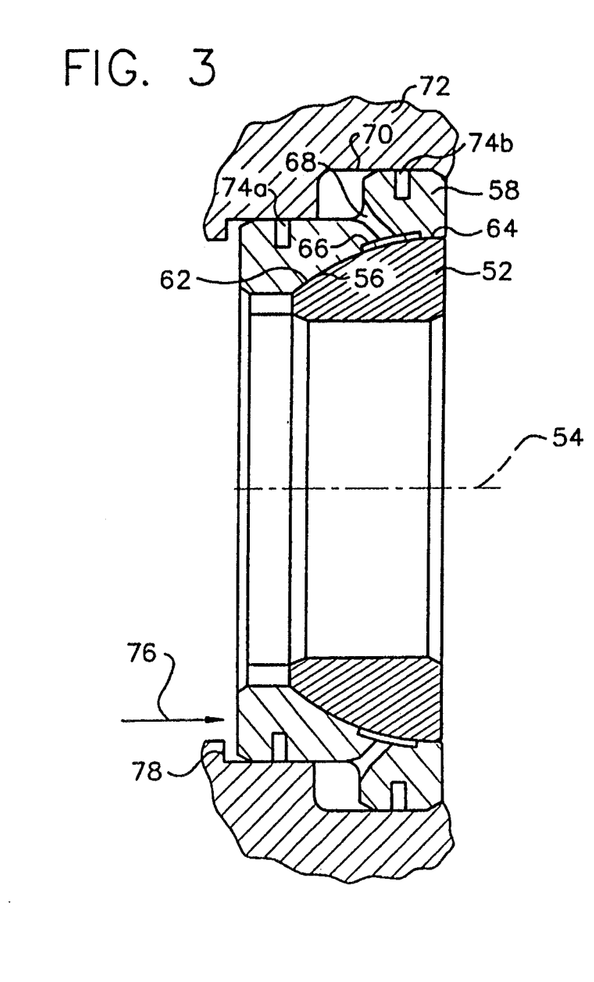
FIG. 3 depicts a self-aligning hydrostatic bearing according to an embodiment of the present invention.

Before discussing the details of the shaft and bearings depicted in FIG. 1 and 2, a generalized discussion of a hydrostatic bearing according to the present invention will be provided in connection with FIG. 3. FIG. 3 depicts a rotating member 52 which rotates about an axis of rotation 54. An exterior surface 56 of the rotating member 52 when in a static, i.e., non-rotating state, defines a section of a sphere. As described below, the shape of the surface 56 will depart from that depicted in FIG. 3 when the rotating member 52 is rotated at a high rate of rotation so as to create significant centrifugal deforming of force. Thus, the rotating member 52 has a static, spherically-shaped surface which is non-spherical when the rotating member 52 is non-static (i.e., rotating). A bearing 58 includes a corresponding concave surface 62. The radius of the surface 62 is slightly larger than the radius of the static surface 56 to provide a clearance region 64 between the rotating surface 56 and the stationary surface 62. The bearing 58 can be positioned such that the center of the imaginary sphere defined by the surface 62 is coincident with the center of the imaginary sphere defined by static surface 56.

The bearing 58 is movable with respect to the rotating member 52. In the embodiment depicted in FIG. 3, the bearing 58 is movable in an axial direction, i.e., in a direction parallel with the axis of rotation 54. The clearance 64 will vary depending upon position of the bearing 58. Moreover when the bearing 58 is positioned such that the center of the imaginary sphere defined by surface 62 is not coincident with the surface of the imaginary sphere defined by surface 56, or when the surface 56 departs from its static shape, the clearance 64 will be spatially variable over the surfaces 56, 62. In order to characterize such a variable clearance, a maximum and minimum distance can be defined with respect to the tangent planes of the spherical surfaces. At each point on the rotating surface 56, a plane tangent to the surface at that point can be defined. For each of the tangent planes on the spherical rotor surface 56, there is a distance from the tangent point to the bearing surface 62, measured along a direction perpendicular to the tangent plane. The maximum value among the distances for each point on the spherical surface 56 is the maximum distance between the spherical rotor surface 56 and the spherical bearing surface 62. The minimum value among the distances for each point on the spherical surface is 56 is the minimum distance between the spherical rotor surface 56 and the spherical bearing surface 62.

A pressurized lubricating fluid is provided to the clearance region 64. As depicted in FIG. 3, the immediate source for the pressurized lubricating fluid is one or more recesses 66 formed in the bearing spherical surface 62. The volume, shape, size, and number of recesses 66 will vary depending upon the use of the bearing. In one embodiment, there are 24 recesses 66 formed in the pump-end bearing, each having a volume of about 0.0005 in³ (0.008 cm³) and having an approximate radius of about 0.125 in. (about 0.3175 cm) and having a depth of about 0.01 in. (about 0.25 mm). In one embodiment, for the turbine-end bearing, there are 16 recesses 66 formed in the bearing, each having a volume of about 0.0005 in.³ (about 0.008 cm³) each having a radius of about 0.125 in (about 0.3175 mm) and a depth of about 0.010 in. (about 0.025 mm).

Pressurized lubrication fluid in the recesses 66 will flow through the clearance 64 and will eventually converge with the main stream of fluid (as depicted in FIG. 1) and be recirculated. The recirculation flow rate will depend upon the pressure of the fluid and the clearance between the spherical surfaces 56, 62. As will be described below, the clearance is at least partially controlled by controlling the axial position of the bearing 58. The pressure on the reservoir 56 is at least partially controlled by the manner in which fluid is provided to the reservoir 66. In the embodiment depicted in FIG. 3, fluid is provided to the reservoir 56 via a constant area orifice 68. The size of the orifice 68 can be selected to provide the desired pressure to the recess 66. The pressure provided to recess 66 depends on both the size of the constant area orifice 68 and the pressure at the inlet of the constant area orifice. As seen in FIG. 3, in one embodiment, the inlet of the constant area orifice 68 communicates with a piston area 70. As will be described more fully below, the pressurized fluid in the piston area 70 is obtained from the orifices 46 connected to a reservoir 44 and in this embodiment the pressurized lubricating fluid is a portion of the fluid provided through the inlet port 16a.

In one embodiment of the invention, the pump-end bearing has 24 orifices each with an outer diameter of about 0.016 inches (about 0.4 mm) and is provided with fluid having a pressure of at least about 1000 psi (about 7000 kPa), preferably ranging between about 2000 psi (13800 kPa) and about 6000 psi (41200 kPa) under normal operating conditions. In one embodiment of the invention, the turbine-end bearing has 16 orifices each with an outer diameter of about 0.016 inches (about 0.4 mm) and is provided with fluid having a pressure ranging between about 2000 psi (13800 kPa) and about 6000 psi (41200 kPa) under normal operating conditions.

The piston area 70 is defined by portions of the walls of the bearing 58 and by portions of walls of the housing 12. Preferably, sealing devices 74a, 74b establish a seal between the bearing 58 and the housing portion 72. The seals 74a, 74b can be any of a number of seals known in the art such as O-rings, piston rings and the like. The axial piston seals 74a, 74b serve to minimize the leakage and allow axial and radial positioning of the bearing cup. Once they are positioned and pressurized, the piston seals and cup act as a rigid bearing support without "deadband" for small loads. High loads will cause the seal to reposition at a new equilibrium position. Under extreme vibratory loads, the seal ring will function as a coulomb damper.

Pressurization of the piston area 70 provides an axial force on the bearing 58 in the direction indicated by the arrow 76. In the embodiment depicted in FIG. 3, the same device 70 which controls axial movement of the bearing 58 also provides the source for fluid to the recess 68. This design provides a constant axial force on the bearing during operation, causing the bearing to operate a constant design clearance. A lip 78 provides an axial stop for the bearing 58 which is useful in preventing excessive axial movement under special conditions such as start-up transients and overload conditions.

Figure 4:
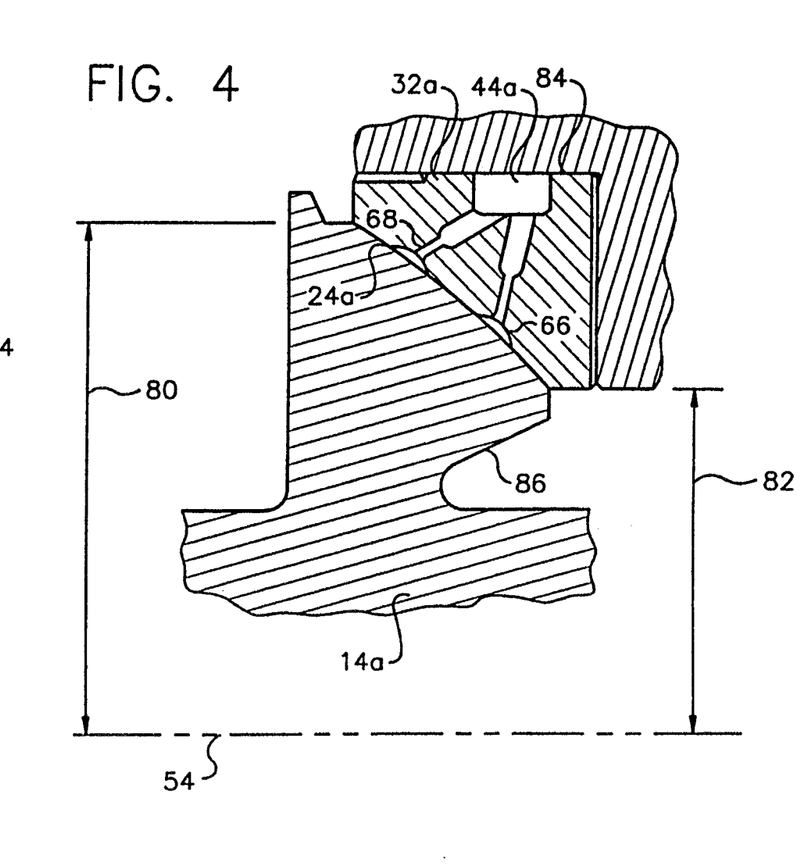
FIG. 4 is a cross-section depicting the pump-end hydrostatic bearing of FIG. 2 in greater detail.

FIG. 4 depicts, in greater detail, the pump-end hydrostatic bearing 32a of the embodiment of FIGS. 1 and 2. The spherical surface 24a of a portion of the rotor 14a has its radially outermost region a first radial distance 80 from the center line 54 and its radially innermost region at a distance 82 from the center line 54. The values for the radial distances 80, 82 will depend upon the overall design of the apparatus 10. In one embodiment, radial distance 80 is about 1.28 inches (about 32.5 mm) and the inner distance 82 is about 0.85 inches (about 21.5 mm). In one embodiment of the invention, the radius of the imaginary sphere defined by the static rotor surface 24a is about 3.7572 inches (about 95.43 mm) in the static (non-rotating) condition. In this embodiment, the radius of the imaginary sphere which best fits the rotor surface when the rotor is distorted by centrifugal force at the maximum normal rate of revolution (about 150,000 rpm) is about 3.7672 inches (about 95.687 mm).

The bearing 32a includes a bearing feed annulus 44a which is supplied by the pump discharge, as described above. The bearing 32a is sized to provide an interference bit with respect to the adjacent portion 84 of the housing 12 to achieve a seal for the containment of fluid provided to the feed annulus 44a and also to provide for high stiffness of the rotor 14a. The rotor 14a is provided with an inner radius or undercut region 86 to control the configuration of the rotor 14a, and especially the spherical surface 24a, in response to centrifugal distortion, as described more fully below.

Figure 5:
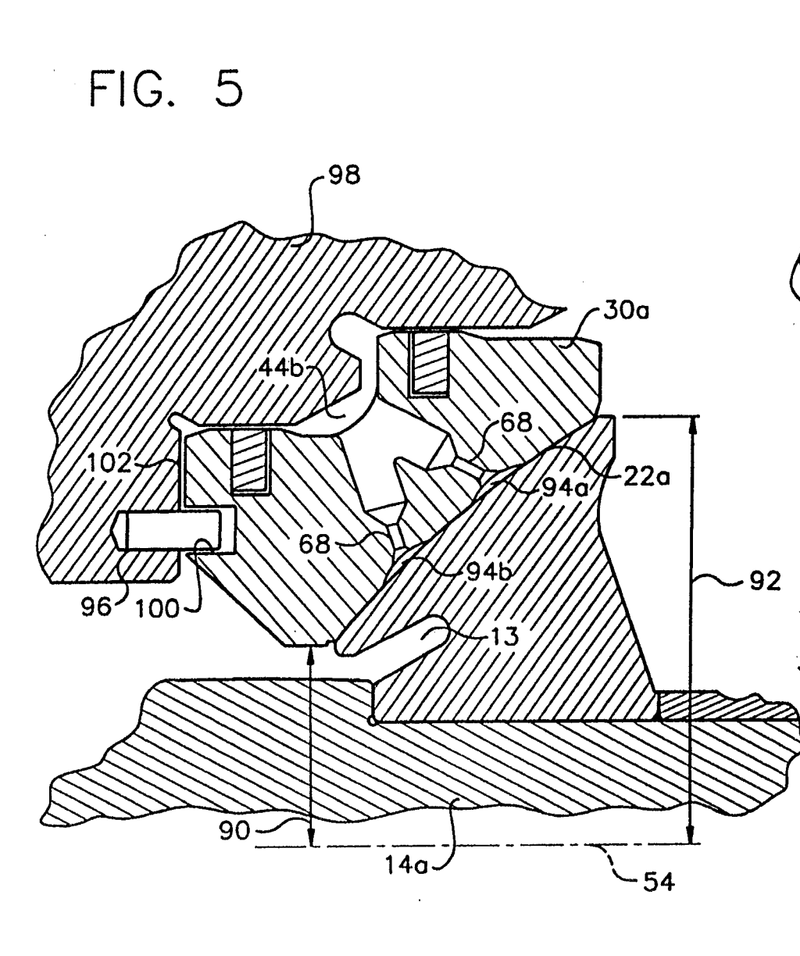
FIG. 5 is a cross-sectional view depicting the turbine-end bearing of FIG. 2 in greater detail.

FIG. 5 depicts the turbine-end bearing 30a. In the embodiment of FIG. 5, the spherical surface 22a extends through a range of radial distance from the axis rotation 54 between an inner radial distance 90 of about 0.60 inches (about 15.2 mm) and an outer radial distance 92 of about 0.80 inches (about 20.5 mm). The radius of the sphere defined by the static surface 22a, in the depicted embodiment, is about 2.8835 inches (about 73.24 mm) and the radius under maximum normal centrifugal distortion is about 2.8845 inches (about 73.27 mm). The bearing 30a includes hydrostatic recesses 94a, 94b fed through hydrostatic compensating orifices 68 which are in fluid communication with an axial load piston 44b which provides substantially constant bearing pre-load and also is the source for the bearing supply pressure. An anti-rotation pin 96 prevents rotation of the bearing 30a with respect to the adjacent portion 98 of the housing 12. The pin 96 fits into a recess 100 formed in the bearing 30a. The adjacent portion of the housing 98 includes a step or lip portion 102 which acts as an axial stop for reverse overload conditions as described above. An inner radius or undercut region 13 is provided for controlling the shape of the spherical portion of the rotor 22a when it is deformed by centrifugal forces, as described more fully below.

Figure 6:
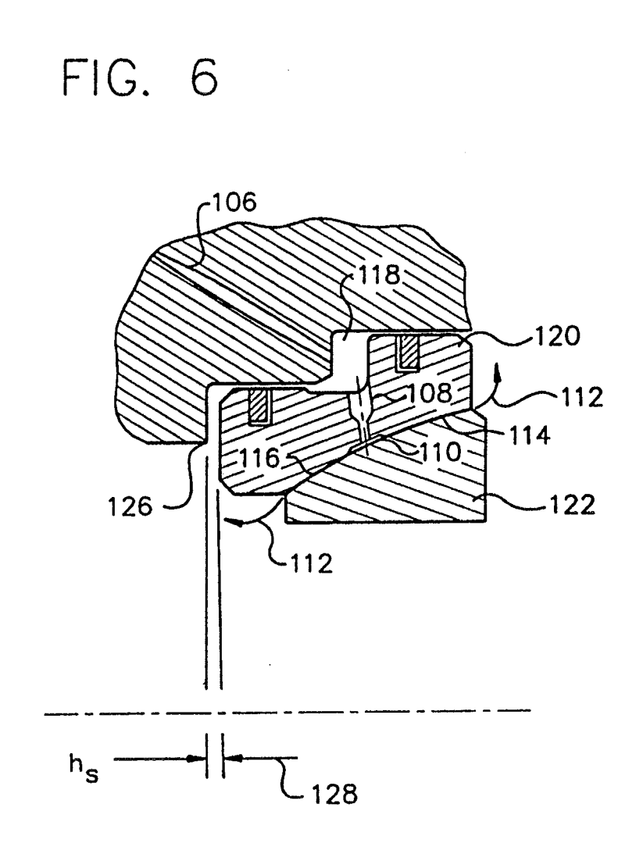
FIG. 6 is a cross-sectional view of a bearing controlled by a piston region.
Figure 7:
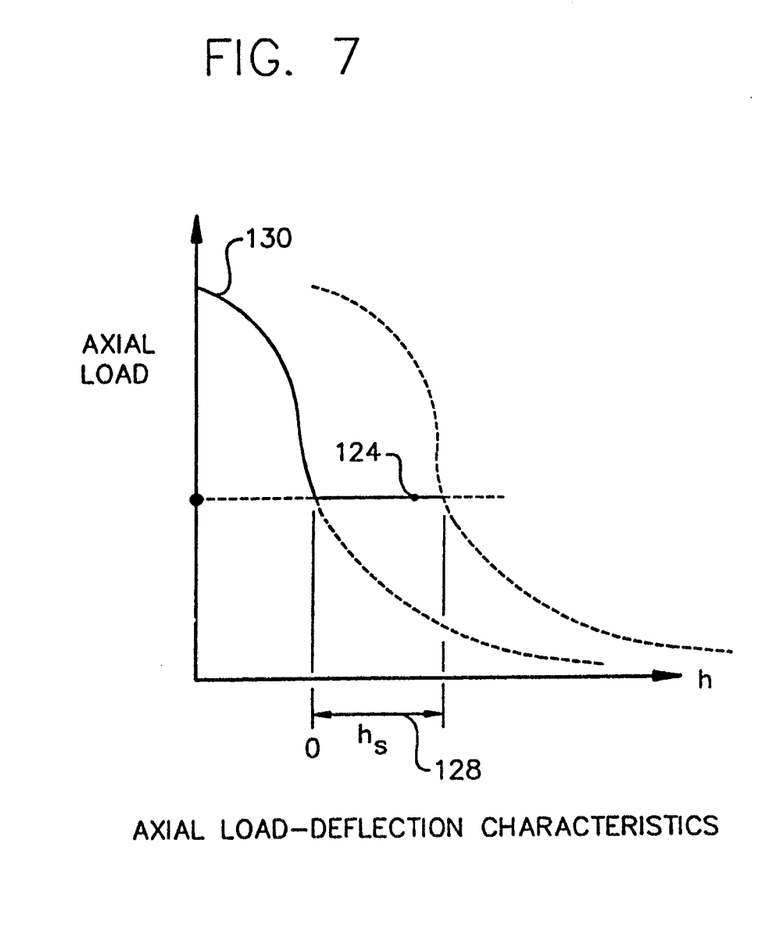
FIG. 7 schematically and graphically depicts the relationship of axial load capacity to bearing clearance.

The manner in which the present invention provides for very high load capacity, even when used in connection with low viscosity fluids, is described in connection with FIGS. 6 and 7. The bearing performance is derived from hydrostatic pressure supplied from an external force (e.g., a high pressure tank or pump discharge). The high pressure supply passes through a series of fixed area compensating orifices 106, 108 to the intermediate pressure recess 110 and exits 112 through the variable area flow restrictor created by the clearance between the rotor surface 114 and the bearing surface 116. As noted above, the hydrostatic pressure within the recess 110 is a function of the size of the orifices 106, 108 and the pressure of the supply fluid. The variable hydrostatic pressure within the recess 110 creates a variable load capacity as the clearance between the surfaces 114, 116 is varied. As discussed above, when other factors are held equal, an increase in the pressure of the piston 118 causes an increase in the axial deflection of a bearing 120. As shown in FIG. 7, when the bearing 120 is positioned axially away from the rotor 122 (i.e., towards the left in the view of FIG. 6) the axial load 124 is substantially constant. However, when pressurization of the piston 118 has caused the bearing 120 to move a first distance $h_s$ 128 away from its axial stop location 126, further (rightward) axial deflection of the bearing 120 causes a further decrease in the clearance between the surfaces 114, 116 and an increase in the axial load capacity 130. At close clearance (high pressurization of the piston 118 and rightward movement of the bearing 120), the pressure in the recess 110 is high and the load capacity 130 is high. At large bearing clearance, the recess pressure and load capacity are low. This hydrostatic action allows the use of low viscosity fluids while achieving very high load capacity, because load capacity is dependent on externally supplied hydrostatic pressure. This load capacity is much greater than could be achieved with a hydrodynamic bearing of similar size using a low viscosity fluid such as liquid hydrogen.

The operating bearing clearance is controlled by the applied load and the design of the compensating orifice 106. Selecting a small size orifice 106, the clearance may be controlled to small values. With small clearances and high load capacity, high bearing stiffness is the result.

Figure 8:
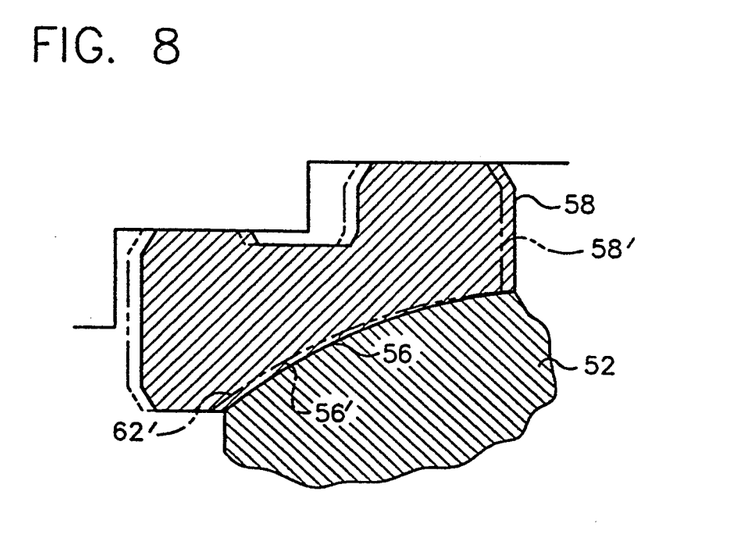
FIG. 8 depicts centrifugal distortion of a rotor and axial positions of an associated bearing.

FIG. 8 depicts, in exaggerated form, one manner in which the axially adjustable bearing 58 can accommodate centrifugal deformation of the rotor 52. Under the influence of centrifugal force at high rotational rates, such as about 150,000 rpm, the static spherical surface of the rotor 56 will be deformed to a new shape 56' (exaggerated in FIG. 8). The new shape 56', while it may depart from sphericity, will approximate a spherical surface with a radius larger than the radius of the static spherical surface 56. This new, larger radius surface 56' is accommodated by an axial movement of the bearing 58 to a new position 58' (exaggerated in FIG. 8). The new position 58' of the rotor 58 places the spherical surface 62' of the bearing 58' so as to accommodate the new shape 56' of the spherical surface of the rotor 52.

The chord angle defined by the spherical surface of the bearing 58 does not change when the bearing 58 moves axially. Accordingly, it would be desirable if the chord angle of the deformed rotor surface 56' was the same as the chord angle of the static rotor surface 56 of the rotor 52.

Figures 9A, 9B:
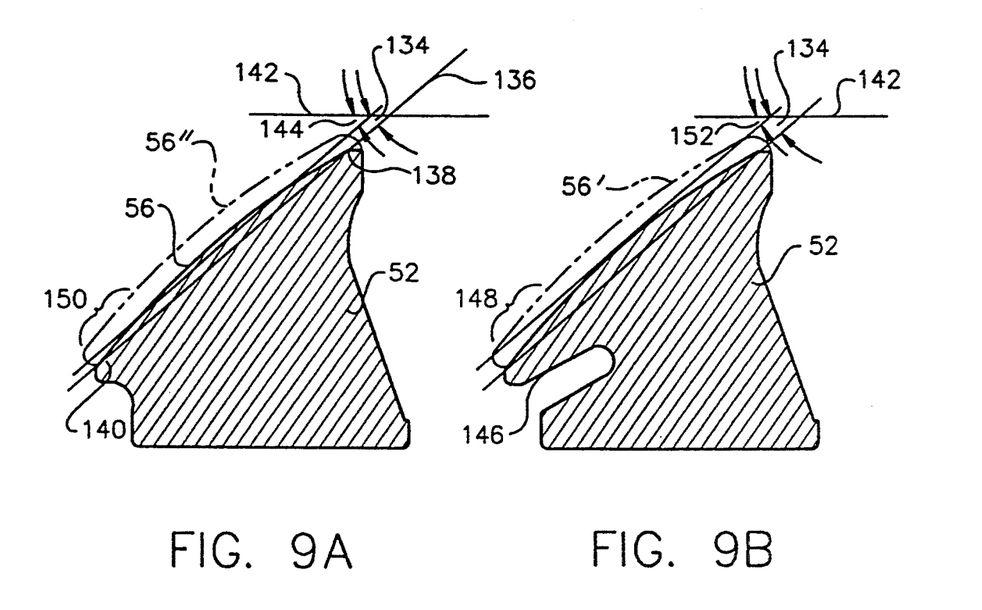
FIG. 9A depicts centrifugal distortion of a rotor.
FIG. 9B depicts centrifugal growth of a rotor configured to maintain a substantially constant chord angle.

A manner of achieving this in the present invention is illustrated in FIGS. 9A and 9B. In FIG. 9A a static chord angle 134 is equal to the angle between a line 136 (coplanar with the rotation axis) passing through the outer and inner edges 138, 140 of the static spherical surface 56 and a line 142 parallel to the rotational axis. In the device depicted in FIG. 9A, the rotor 52 has not been designed to maintain a constant chord angle. Accordingly, the centrifugally deformed chord angle 144 defined by the centrifugally deformed surface 56" is not equal to the static chord angle 134. In FIG. 9B, a portion of the rotor 52 has been shaped to include an undercut or inner radius region 146. This undercut region 146 is shaped so that the radially inner portion 148 of the spherical surface 56' moves radially outward more than the corresponding surface 150 of the rotor depicted in FIG. 9A. As a consequence, the centrifugally deformed chord angle 152 of the embodiment shown in FIG. 9B is substantially equal to the static chord angle 134.

Figure 10:
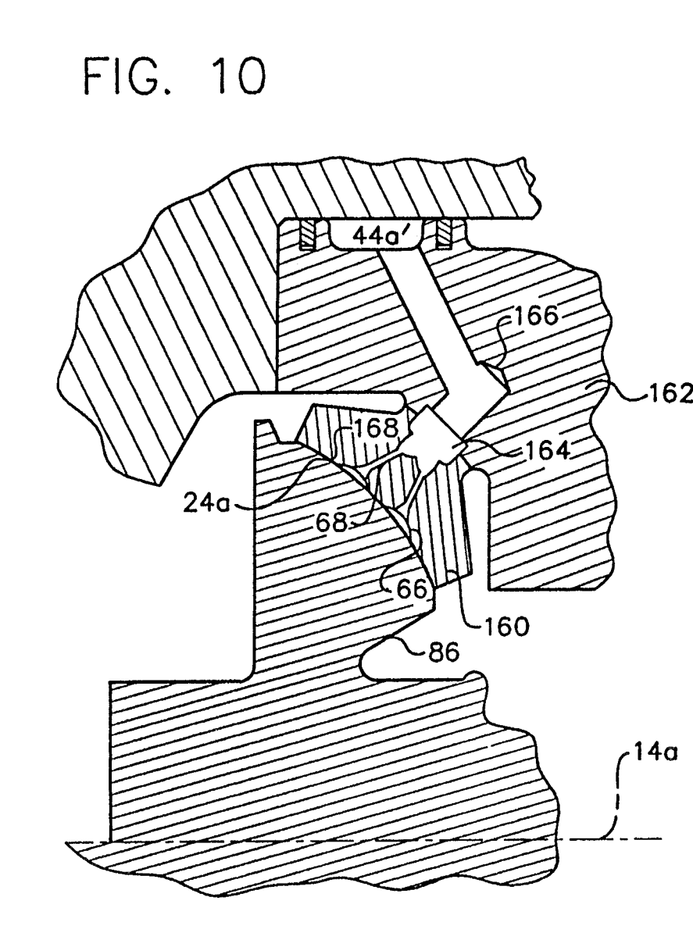
FIG. 10 depicts a bearing similar to that of FIG. 4 but having a pivoting bearing pad.
Figure 10A:
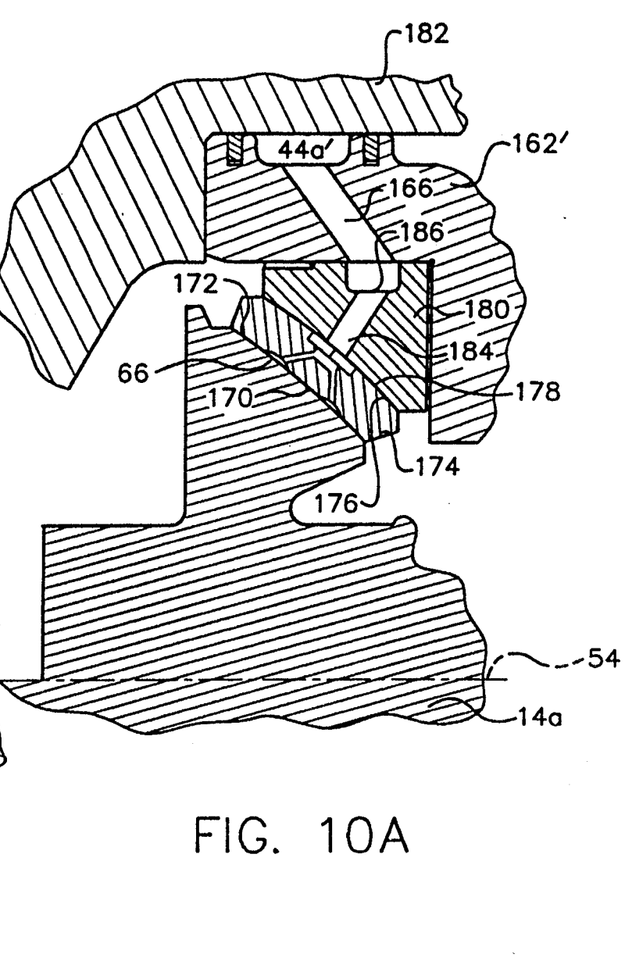
FIG. 10A depicts a bearing similar to that of FIG. 10 but having a conical rotor surface.
Figure 11:
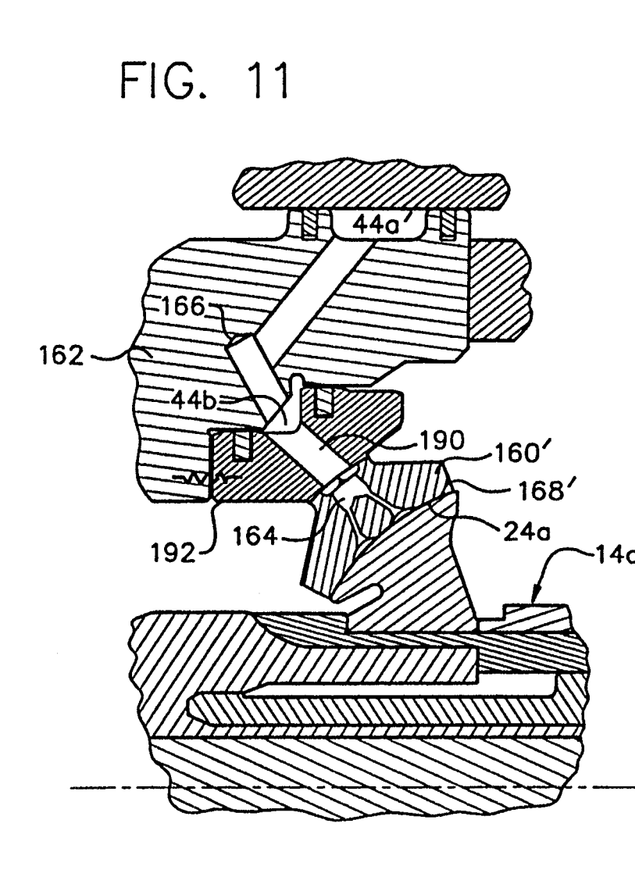
FIG. 11 depicts a bearing similar to that of FIG. 5 but having a pivoting bearing pad.

FIGS. 10, 10A and 11 depict devices for accommodating centrifugal growth or deformation of the rotor which can be used in place of or in addition to the undercutting 146 depicted in FIG. 9B. FIG. 10 is similar to FIG. 4 except that the spherical rotor surface 24a, rather than contacting a fixed or axially movable bearing 32a, instead, contacts a pivotable bearing pad 160. The pad 160 is pivotally mounted to a fixed or axially movable conical surfaces of bearing support 162. Recesses 66 are fed via orifices 68 connected to a reservoir 164. The reservoir 164 is fed by bearing feed lines 166 connected to a reservoir 44a'. The bearing surface 168 of the pad 160 has a concave, spherical shape corresponding to the spherical shape of the portion of the rotor 24a. The bearing pad 160 is preferably mounted so as to permit pivoting about an axis substantially perpendicular to the rotation axis 54, without substantial pivoting about any axis which is not substantially perpendicular to the rotation axis 54. Hydrostatic pressure variations within the bearing produce forces sufficient to pivot the spherical mounted bearing pad 160. The articulated hydrostatic bearing surface 160, in addition to accommodating chord angle variation arising from centrifugal force, also accommodates production tolerance effects, thermal deformation, and the like.

The embodiment depicted in FIG. 10A is similar to that depicted in FIG. 10 except that surface 170 of the rotor 14a and the corresponding surface 172 of the bearing pad 174 are conical surfaces rather than spherical surfaces. The conical shape allows radial growth (arising from centrifugal deformation) without substantially affecting the bearing. The surface 176 of the pad 174 which is opposite the conical surface 172 defines a portion of a sphere. This surface 176 is adjacent a concave spherical surface 178 of a bearing block 180. The spherical surfaces 176, 178 accommodate angular misalignment in a manner similar to the spherical surfaces of the previously-described embodiments. The block 180 is held in position by a bearing device 162' adjacent a portion 182 of the housing 12. Bearing feed lines 166, 184 and intermediate reservoir 186 provide individual supply to the recesses 66.

FIG. 11 is similar to FIG. 10 but depicts a pivotally mounted bearing 160' as the turbine-end bearing. The pivoting bearing 160' has a concave spherical surface 168' adjacent and substantially parallel to the spherical surface 24a of the rotor 14a. The bearing feed line 166 does not directly supply the pivoting pad reservoir 164. Instead, it supplies the piston region 44b of an axially movable bearing block 192 connected by a conduit 190 to the reservoir 164. As in the embodiment of 165, the piston 44b acts to control the axial movement of the bearing block 192.

Figure 12A:
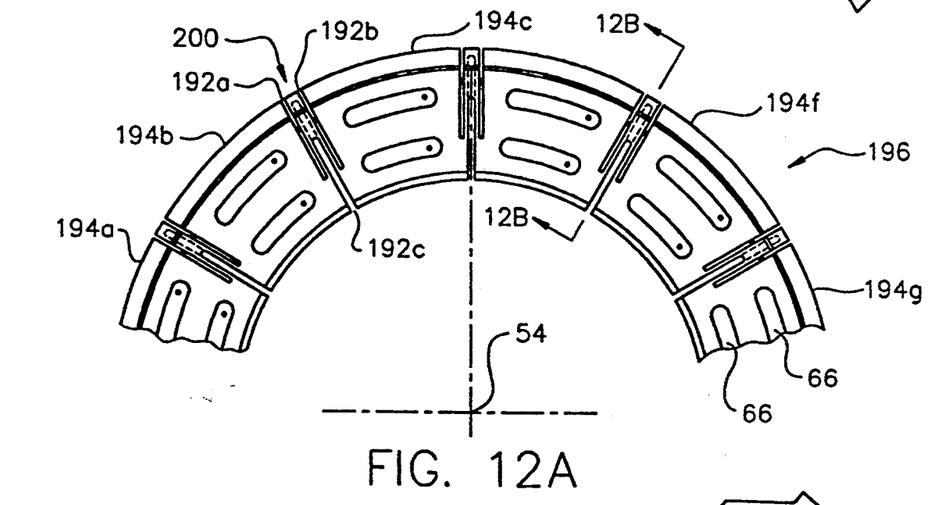
FIG. 12A is a partial axial elevational view of a bearing according to one embodiment of the present invention.
Figure 12B:
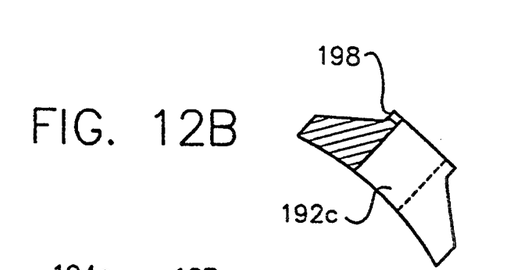
FIG. 12B is a cross-sectional view taken along line 12B—12B of FIG. 12A.

Preferably, one or more of the bearings 30a, 30b, 32a, 32b also function as a seal. In one embodiment of the invention, a pivotal bearing pad 160, 160', 174 is used The pivotal pads are portions of a preferably integral cup-shaped, annular bearing ring. The annular bearing ring provides an annularly continuous sealing surface. One configuration that provides such a continuous surface while also providing the low torsional stiffness needed to permit pivoting of the pads in response to low pivot forces is shown in FIGS. 12A and 12B. In these figures, radial slots 192a, 192b, 192c partially separate sections, 194a–194g of the bearing ring. However, because there is not a complete separation of the sections 194a–194g, continuous material along a serpentine, generally annular path permits the bearing ring 196 to function as a seal against the adjacent spherical or conical rotor surface, e.g., to prevent flow of fluid in a direction from the inlet region 210 towards exit region 211. The partial slot 198 maintains the seal function of the bearing. The slots 192a, 192b, 192c result in a wave spring 200 between the individual sections or pads 194a–194g to allow circumferential adjustment.

Figure 13A:
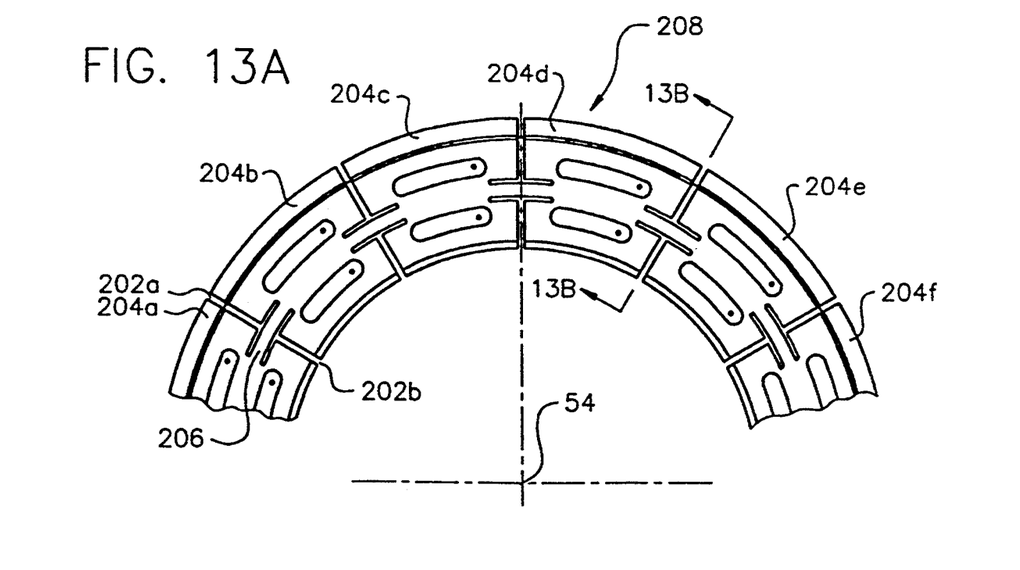
FIG. 13A is a plan view of a bearing similar to that of FIG. 12A, but showing an alternative embodiment.
Figure 13B:
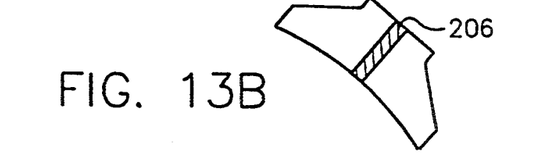
FIG. 13B is a cross-sectional view taken along line 13B—13B of FIG. 13A.

An alternative embodiment is depicted in FIG. 13A. In this embodiment, T-shaped slots 202a, 202b are provided between segments 204a–204g. This allows for circumferential twisting without changing radius. The regions 206 between the T-shaped pads provide a flexing beam and the resultant continuous, annular path around the bearing ring 208 maintains the seal function of the bearing. The one-piece bearing design of the embodiments of FIGS. 12A and 13A eliminates pad-to-pad tolerance.

In light of the above description, a number of advantages of the present invention can be seen. The present invention provides a high load capability with a low recirculation flow rate. In many previous high-speed, low viscosity devices, bearing axial and radial load support were divided between a straight, cylindrical bearing and a separate axial thrust bearing. The bearing surface of the present invention will support both radial and axial rotor loads. With only one bearing surface to accomplish dual load support function, the flow rate required for the bearing system is reduced considerably over a separated bearing design. When the bearing is used in the arrangement disclosed, the bearing also performs as the impeller backside seal. This combination of bearing and seal function offers an additional reduction in turbopump recirculation flow. This reduction is especially beneficial in low specific speed pumps.

The present invention provides self-alignment and self-adjustment. The spherical shape allows self-alignment about the x and y axis normal to the shaft center line. This self-alignment is continuous while operating at high-speeds. In order to accommodate tolerances and thermal, hydraulic and mechanical deflections while maintaining small operating clearances, one or both bearings are free to adjust in the axial direction. The piston area which can be used for axial adjustment is formed by two stepped concentric cylindrical surfaces sealed by piston rings, O-rings or other static seal designs. The feed pressure to the bearing is fed through this piston area as it is being supplied to the bearing. This design provides a constant axial force on the bearing causing the bearing to operate at a constant design clearance.

The present invention accommodates centrifugal deflection while maintaining a constant operating clearance. In addition to centrifugal growth, the center point of the sphere will change location at high-speed due to unsymmetrical shape. The chord angle of the arc of the sphere segment is maintained as a constant by contouring the rotating sphere in a radius and/or by providing bearing pads which are pivotally movable.

The present invention provides for very high axial and radial stiffness (such as greater than about $1 \times 10^6$ lb/in, about $1.8 \times 10^6$ N/cm, preferably greater than about $4 \times 10^6$ lb/in, (about $7.2 \times 10^6$ N/cm) particularly in connection with low viscosity fluids. The present invention provides high axial and radial load capacity (such as greater than about 1000 lb, about 375 kg, preferably about 1600 lb, about 600 kg) so as to avoid subsynchronous whirl even in very high rotational speed devices (e.g., rotating at greater than about 50,000 rpm, preferably greater than about 100,000 rpm) used in connection with pumping low viscosity fluids such as liquid hydrogen, liquid oxygen and the like. The close clearance (such as less than about 0.0005 in. (about 0.012 mm) permits high pressure differential operation (such as greater than about 6000 psi (41200 kPa) differential), which provides high load capacity. The variable hydrostatic pressure creates a variable load capacity which allows the use of low viscosity fluids (such as less than about 1 centipoise, preferably less than about 0.05 centipoise, more preferably less than about 0.010 centipoise) while still achieving very high load capacity. By using a spherical surface, very close clearances can be obtained without the difficult fabrication and machining operations needed for separate thrust and journal bearings providing comparable performance. The present invention provides for self-adjusting in response to radial, axial and angular misalignment. The apparatus of the present invention occupies a small volume compared to devices of previous design with similar capability, permitting freedom of design arrangement without speed limitations. The piston ring seals provide coulomb damping that is not provided by ball bearings, for example. As a result of being able to operate a close clearance under a high pressure, the flow rate is very low, which adds to the efficiency of the turbo pump. When properly integrated with the rotor, the resulting rotor/bearing system will operate sub-critical, thus avoiding subsynchronous whirl, minimizing rub potential and providing low flow rate. Tight axial control on the rotor position allows the use of open pump impellers at close clearance, resulting in high efficiency, higher speed due to the low stress of unshrouded impellers and low fabrications cost.

The present invention provides for long life and extended operation time such as will be useful in connection with vehicles such as the National Aerospace hypersonic aircraft scramjet turbo pumps, space power and refrigeration rotating machinery.

A number of variations and modifications of the present invention can also be used. Certain aspects of the present invention can be used without also using other aspects of the invention. For example, it is possible to use an axially adjustable bearing without also using an undercut region. The bearings described above can be used for purposes other than a pumping device, such as for a compressor or a turbine drive or other high speed spindle. The present invention can be used, for example, in small high pressure cryogenic turbo machinery such as OTV fuel and liquid oxygen turbo pumps, in connection with high pressure gas (compressible flow) turbo machinery, high pressure, high efficiency turbo machinery where efficiency is critical and any turbo machinery or rotating machine that would benefit from operating subcritical or from minimum deflection, such as where the bearing system is the controlling component. The present invention can be used for pumping or otherwise treating fluids other than the low viscosity fluids described above. Although a two-spool turbo pump has been described, devices with more or fewer stages can also be used.

Although the present invention has been described by way of a preferred embodiment and certain variations and modifications, other variations and modifications of the present invention can also be used, the invention being defined by the following claims.

What is claimed is:

1. A rotatable shaft apparatus with a hydrostatic bearing, the apparatus comprising:

a housing;

a shaft rotatably mounted with respect to said housing, said shaft being rotatable about a first axis, said shaft including a first surface having a static shape substantially defining a section of a sphere, the center of the sphere defined by said first surface being located at a first point on said first axis;

a first bearing, non-rotating about said first axis, said bearing having a second surface substantially in the shape of a section of a sphere, the center of the sphere defined by said second surface being located on said first axis, said first bearing being movable with respect to said first surface between at least a first position in which said second surface is a first maximum distance from said second surface, to define a first region of clearance between said first surface and said second surface and a second position, different from said first position, in which said second surface is a second maximum distance from said first surface;

an orifice for conveying a pressurized lubrication fluid to said first region of clearance; and wherein said apparatus has a load capacity of greater than about 1600 lbs.

2. A rotatable shaft apparatus with a hydrostatic bearing, the apparatus comprising:

a housing;

a shaft rotatably mounted with respect to said housing, said shaft being rotatable about a first axis, said shaft including a first surface having a static shape substantially defining a section of a sphere, the center of the sphere defined by said first surface being located at a first point on said first axis;

a first bearing, non-rotating about said first axis, said bearing having a second surface substantially in the shape of a section of a sphere, the center of the sphere defined by said second surface being located on said first axis, said first bearing being movable with respect to said first surface between at least a first position in which said second surface is a first maximum distance from said second surface, to define a first region of clearance between said first surface and said second surface and a second position, different from said first position, in which said second surface is a second maximum distance from said first surface;

an orifice for conveying a pressurized lubrication fluid to said first region of clearance;

a piston, coupled to said first bearing wherein said first bearing is movable in response to a change in pressure in said piston; and comprising a first orifice for conveying a pressurized fluid to said piston and a second orifice for conveying pressurized fluid from said piston to said recess.

3. A rotatable shaft apparatus with a hydrostatic bearing, the apparatus comprising:

a housing;

a shaft rotatably mounted with respect to said housing, said shaft being rotatable about a first axis, said shaft including a first surface having a static shape substantially defining a section of a sphere, the center of the sphere defined by said first surface being located at a first point on said first axis;

a first bearing, non-rotating about said first axis, said bearing having a second surface substantially in the shape of a section of a sphere, the center of the sphere defined by said second surface being located on said first axis, said first bearing being movable with respect to said first surface between at least a first position in Which said second surface is a first maximum distance from said second surface, to define a first region of clearance between said first surface and said second surface and a second position, different from said first position, in which said second surface is a second maximum distance from said first surface;

an orifice for conveying a pressurized lubrication fluid to said first region of clearance; and said first maximum distance is less than about 0.001 inches.

4. A rotatable shaft apparatus with a hydrostatic bearing, the apparatus comprising:

a housing;

a shaft rotatably mounted with respect to said housing, said shaft being rotatable about a first axis, said shaft including a first surface having a static shape substantially defining a section of a sphere, the center of the sphere defined by said first surface being located at a first point on said first axis;

a first bearing, non-rotating about said first axis, said bearing having a second surface substantially in the shape of a section of a sphere, the center of the sphere defined by said second surface being located on said first axis, said first bearing being movably mounted with respect to said first surface to define a first region of clearance between said first surface and said second surface;

means for conveying a pressurized lubrication fluid to said first region of clearance;

means for axially adjusting the position of said first bearing;

means for accommodating centrifugal expansion of said first surface; and wherein said means to accommodate centrifugal expansion further comprises at least a first slot formed in said first bearing.

* * * * *